US012743590B2

(12) United States Patent
Elshin

(10) Patent No.: US 12,743,590 B2
(45) Date of Patent: Sep. 22, 2026

(54) METHOD AND A SYSTEM FOR TRAINING A TRANSLATION MACHINE-LEARNING MODEL

(71) Applicant: Y.E. Hub Armenia LLC, Yerevan (AM)

(72) Inventor: Denis Elshin, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 117 days.

(21) Appl. No.: 18/911,936

(22) Filed: Oct. 10, 2024

(65) Prior Publication Data

US 2025/0117607 A1 Apr. 10, 2025

(30) Foreign Application Priority Data

Oct. 10, 2023 (RU) ........................... RU2023125866

(51) Int. Cl.
*G06F 40/58* (2020.01)

(52) U.S. Cl.
CPC .................................... *G06F 40/58* (2020.01)

(58) Field of Classification Search
CPC ....................................................... G06F 40/58
See application file for complete search history.

(56) References Cited

U.S. PATENT DOCUMENTS

2008/0086300 A1 4/2008 Anisimovich et al.
2023/0025739 A1* 1/2023 Zhou ....................... G06F 40/58
2023/0026910 A1 1/2023 Meyer et al.

FOREIGN PATENT DOCUMENTS

CN 112100063 A 12/2020
CN 114881051 A 8/2022
JP 5780670 B2 3/2013
JP 2013054608 A 3/2013
JP 2015072509 A 4/2015
KR 20190112524 A 10/2019
(Continued)

OTHER PUBLICATIONS

Park, Building a Neural Machine Translation System Using Only Synthetic Parallel Data, 2017, arXiv, whole document (Year: 2017).*
(Continued)

*Primary Examiner* — Sonia L Gay
(74) *Attorney, Agent, or Firm* — BCF LLP

(57) ABSTRACT

A method and a server for generating a training set of data for training a translation machine-learning model are provided. The method comprises: receiving: (i) a source language corpus of texts in the source language; and (ii) a corresponding target language corpus of texts in the target language; generating a first variant of translation of a given source language phrase from the source language corpus into the target language; and a first confidence score thereof; generating a second variant of translation of the given source language phrase into the target language; and a second confidence score thereof; and in response to one of the first and second confidence scores being greater than a base confidence score associated with a respective target language phrase from the corresponding target language corpus, replacing the respective target language phrase with a respective one of the first and second variants of translation.

20 Claims, 7 Drawing Sheets

(56) References Cited

FOREIGN PATENT DOCUMENTS

| | | | |
|---|---|---|---|
| RU | 2571588 | C2 | 12/2015 |
| RU | 2770569 | C2 | 4/2022 |
| RU | 2789796 | C2 | 2/2023 |

OTHER PUBLICATIONS

Russian Search Report dated Oct. 25, 2023 issued in respect of the counterpart Russian Patent Application No. RU 2023125866.

Ahn et al. "Automatic Generation of Translation Dictionaries Using Intermediary Languages", ICCS, School of Informatics, Edinburgh University, Published in Jan. 2006, https://aclanthology.org/W06-2006.pdf.

* cited by examiner

METHOD AND A SYSTEM FOR TRAINING A TRANSLATION MACHINE-LEARNING MODEL

CROSS-REFERENCE

The present application claims priority to Russian Patent Application No. 2023125866, entitled "Method and a System for Training a Translation Machine-Learning Model", filed Oct. 10, 2023, the entirety of which is incorporated herein by reference.

FIELD

The present technology relates to field of machine translation in general and, specifically, to a method and a system for generating a training set of data for training a translation machine-learning model.

BACKGROUND

With the growth of users of the Internet, a vast amount of Internet-based services has surfaced. Such services include, for example, search engine services (such as Yandex™ and Google™ search engines, for example) that allow users to retrieve information by submitting queries to a search engine. Also, social network services as well as multimedia services enable a large variety of users with different social and cultural backgrounds to engage on unified platforms for exchanging content and information. Digital content and other information being exchanged amongst users may be in a variety of languages. For that reason, due to the ever-increasing amount of information being exchanged on the Internet, translation services such as Yandex.Translate™, for example, are often used.

The latter service has been particularly useful in allowing users to easily translate a text (or even a speech) from one language (that is, a "source language"), which the user does not understand, into another one (that is, a "target language"), which they do. This means that translation services are generally designed to provide a translated version of content in the target language that the user understands to make that content intelligible for the user.

Translation engines typically comprise machine-learning (ML) model (hence referred to herein as "translation ML model") that are trained to translate texts from the source into target languages based on a large number of examples of parallel sentences between the source and target languages. However, conventional computer systems providing translation services still have many drawbacks, such as providing correct translation of a rare word or a word specific to a particular domain.

More specifically, one of the challenges associated with training a given translation ML model is that the training examples of parallel sentences (that is, pairs comprising phrases in the source language and their translations into the target language) are usually, at least partially, generated by other, low-quality, translation ML models. As a result, the given translation ML model can learn incorrect correspondences between the sentences of the source and target language and therefore generate poor-quality translations.

Certain prior art approaches have been proposed to tackle the above-identified technical problem.

Japanese Patent No.: 5,780,670-B2, issued on Sep. 16, 2015, assigned to Nippon Telegraph and Telephone Corp., and entitled "TRANSLATION APPARATUS, METHOD, AND PROGRAM, AND TRANSLATION MODEL LEARNING APPARATUS, METHOD, AND PROGRAM" discloses a learning preprocessing part that generates translation intermediate language in which translation source language is replaced with vocabularies of translation destination language using a word order close to the translation source language. A first-translation learning part learns a first-translation model for translating the translation source language into an intermediate translation sentence using a parallel corpus of the translation source language and the translation intermediate language. A latter-translation learning part learns a latter-translation model 36 for translating the intermediate translation sentence into the translation destination language using a parallel corpus of the translation intermediate language and the translation destination language. A first-translation part refers to the first-translation model and translates an input sentence into the intermediate translation sentence. A latter-translation part refers to the latter-translation model and translates the intermediate translation sentence into a sentence of the translation destination language.

Chinese Patent Application Publication No.: 114,881,051-A, published on Aug. 9, 2022, assigned to Beijing Baidu Netcom Science and Technology Co Ltd, and entitled "TRANSLATION QUALITY DETERMINATION METHOD, RELATED DEVICE AND COMPUTER PROGRAM PRODUCT," discloses a translation quality determination method. The method comprises the steps of obtaining a first corpus and a second corpus which are different in language and consistent in semantic meaning, replacing key information in the second corpus with query words, building a third corpus of which a sentence pattern is a query sentence, generating a fourth corpus which corresponds to the semantic meaning of the first corpus and is identical in language with the second corpus by using a translation model, determining first result information corresponding to a query in the third corpus in the fourth corpus, and generating first evaluation information for evaluating the translation quality of the translation model based on the similarity between the key information and the first result information. The embodiment provides a translation quality determination method, and the translation quality of a translation model is evaluated based on the comprehension capability of a semantic level.

SUMMARY

It is an object of the present technology to ameliorate at least some of the inconveniences present in the prior art.

The developers of the present technology have appreciated that the quality of the training examples for training the given translation ML model can be increased by identifying in source and target corpora of texts, used for generating the training examples, non-parallel sentences, that is, those that, unlike the parallel sentences, do not correspond to each other in meaning in the source and target languages and can thus form poor-quality training examples.

To that end, the methods and systems described herein are directed to using two additional translation ML models. More specifically, according to certain non-limiting embodiments of the present technology, (i) a first additional translation ML model has been trained to translate the text from the source into the target language; and (ii) a second additional translation ML model is trained, for example, to translate the text from the source language into an intermediate language (different from both the source and the target language) and from the intermediate to the target language.

Thus, to generate the training examples, at least some non-limiting embodiments of the present technology are directed to: (i) feeding a given source sentence from the source corpus of texts to each one of the first and second additional translation ML models to generate a first variant of translation and a second variant of translation of the given source sentence, respectively; (ii) determine, for each one of the first and second variants of translation, a respective confidence score indicative of their translation accuracy; and (iii) determining whether one of the confidence scores associated with the first and second variants of translation is greater than a confidence score associated with a respective target sentence initially corresponding to the given source sentence in the target corpus of texts. Further, in response to determining that one of the confidence scores associated with the first and second variants of translation of the given source sentence is greater than the confidence scores associated with the respective target sentence, the present methods are directed to replacing, in the target corpus of texts, the respective target sentence with the respective one of the first and second variants of translation associated with the higher confidence score.

By doing so, the present method and systems may allow refining the target corpus of texts with sentences in the target language that are closer in meaning to the respective source sentences. Thus, the so refined target corpus of texts can further be used for generating higher quality training examples for training the given translation ML model, which, in turn, can then provide higher-quality translations.

More specifically, according to one broad aspect of the present technology, there is provided a computer-implemented method computer-implementable method of generating a training set of data for training a translation machine-learning (ML) model The generating includes using: (i) a first translation ML model having been pre-trained to translate text from a source language to a target language; and (ii) a second ML model having been pre-trained to translate the text from the source language to an intermediate language and from the intermediate language to the target language. The method comprises: receiving: (i) a source language corpus of texts including a first plurality of phrases in the source language; and (ii) a target language corpus of texts including a second plurality of phrases in the target language, a respective target language phrase from the second plurality of phrases being a translation of a given source language phrase from the first plurality of phrases from the source language into the target language; the respective target language phrase being associated with a base confidence score indicative of a translation accuracy of the respective target language phrase; feeding the given source language phrase to the first translation ML model to generate: a first variant of translation of the given source language phrase into the target language; and a first confidence score indicative of a translation accuracy of the first variant of translation; feeding the given source language phrase to the second translation ML model to generate: a second variant of translation of the given source language phrase into the target language; and a second confidence score indicative of the translation accuracy of the second variant of translation; in response to one of the first and second confidence scores being greater than the base confidence score associated with the respective target language phrase, replacing, in the target language corpus, the respective target language phrase with a respective one of the first and second variants of translation of the given source language phrase; generating the training set of data including a plurality of training digital objects, a given one of which includes: (i) the given source language phrase; and (ii) the respective one of the first and second variants of translation of the given source language phrase; and training, based on the training set of data, the translation ML model to translate the text from the source language into the target language.

In some implementations of the method, the method further comprises: in response to each one of the first and second confidence scores being lower than or equal to the base confidence score associated with the respective target language phrase, keeping the respective target language phrase in the target language corpus.

In some implementations of the method, the method further comprises determining the base confidence score associated with the respective target language phrase.

In some implementations of the method, the determining the base confidence score comprises applying the first translation ML model.

In some implementations of the method, the method further comprises using a third translation ML model having been pre-trained to translate text from the target language to the source language; and wherein generating a given confidence score of the base, first, and second confidence scores comprises: generating a respective direct confidence score of a respective one of the respective target language phrase and the first and second variants of translation of the given source language phrase into the target language; feeding each one of the respective target language phrase and the first and second variants of translation of the given source language phrase to the third translation ML model to generate: respective inverse variants of translation of the respective target language phrase associated with the given source language phrase into the source language; and a respective inverse confidence score of each one of the respective inverse variants of translation of the respective target language phrase into the source language; and combining the respective direct and the respective inverse confidence scores.

In some implementations of the method, the combining comprises determining a sum of the respective direct and the respective inverse confidence levels.

In some implementations of the method, the translation ML model is different from any one of the first and second translation ML models.

In some implementations of the method, the translation ML model is one of the first and second translation ML models; and the training the translation ML model comprises fine-tuning the one of the first and the second translation ML models to translate the text from the source language into the target language.

In some implementations of the method, the second translation ML model comprises two translation ML models: (i) a first intermediate translation ML model having been pre-trained to translate the text from the source language to the intermediate language; and (ii) a second intermediate translation ML model having been pre-trained to translate the text from the intermediate language to the target language.

In some implementations of the method, a given one of the first and second translation ML models is a neural network-based ML model.

In some implementations of the method, the neural network-based ML model is a Transformer ML model.

In accordance with another broad aspect of the present technology, there is provided a server for generating a training set of data for training a translation machine-learning (ML) model. The generating includes using: (i) a first translation ML model having been pre-trained to translate text from a source language to a target language; and (ii) a second ML model having been pre-trained to translate the text from the source language to an intermediate language and from the intermediate language to the target language. The server comprises at least one processor and at least one non-transitory computer-readable memory comprising executable instructions, which, when executed by the processor, cause the server to: receive: (i) a source language corpus of texts including a first plurality of phrases in the source language; and (ii) a target language corpus of texts including a second plurality of phrases in the target language, a respective target language phrase from the second plurality of phrases being a translation of a given source language phrase from the first plurality of phrases from the source language into the target language; the respective target language phrase being associated with a base confidence score indicative of a translation accuracy of the respective target language phrase; feed the given source language phrase to the first translation ML model to generate: a first variant of translation of the given source language phrase into the target language; and a first confidence score indicative of a translation accuracy of the first variant of translation; feed the given source language phrase to the second translation ML model to generate: a second variant of translation of the given source language phrase into the target language; and a second confidence score indicative of the translation accuracy of the second variant of translation; in response to one of the first and second confidence scores being greater than the base confidence score associated with the respective target language phrase, replace, in the target language corpus, the respective target language phrase with a respective one of the first and second variants of translation of the given source language phrase; generate the training set of data including a plurality of training digital objects, a given one of which includes: (i) the given source language phrase; and (ii) the respective one of the first and second variants of translation of the given source language phrase; and train, based on the training set of data, the translation ML model to translate the text from the source language into the target language.

In some implementations of the server, the at least one processor further causes the server to: in response to each one of the first and second confidence scores being lower than or equal to the base confidence score associated with the respective target language phrase, keep the respective target language phrase in the target language corpus.

In some implementations of the server, the at least one processor further causes the server to determine the base confidence score associated with the respective target language phrase.

In some implementations of the server, to determine the base confidence score, the at least one processor causes the server to apply the first translation ML model.

In some implementations of the server, the at least one processor further causes the server to gain access to a third translation ML model having been pre-trained to translate text from the target language to the source language; and wherein: to generate a given confidence score of the base, first, and second confidence score, the at least one processor causes the server to: generate a respective direct confidence score of a respective one of the respective target language phrase and the first and second variants of translation of the given source language phrase into the target language; feed each one of the respective target language phrase and the first and second variants of translation of the given source language phrase to the third translation ML model to generate: respective inverse variants of translation of the respective target language phrase associated with the given source language phrase into the source language; and a respective inverse confidence score of each one of the respective inverse variants of translation of the respective target language phrase into the source language; and combine the respective direct and the respective inverse confidence scores.

In some implementations of the server, to combine the respective direct and inverse confidence scores, the at least one processor causes the server to determine a sum of the respective direct and the respective inverse confidence levels.

In some implementations of the server, the translation ML model is different from any one of the first and second translation ML models.

In some implementations of the server, the translation ML model is one of the first and second translation ML models; and the training the translation ML model comprises fine-tuning the one of the first and the second translation ML models to translate the text from the source language into the target language.

In some implementations of the server, the second translation ML model comprises two translation ML models: (i) a first intermediate translation ML model having been pre-trained to translate the text from the source language to the intermediate language; and (ii) a second intermediate translation ML model having been pre-trained to translate the text from the intermediate language to the target language.

In the context of the present specific, a "transformer" model is a model having an encoder-decoder architecture that employs attention mechanisms. Attention mechanisms may be employed during processing of data by the encoder, during processing of data by the decoder, and during encoder-decoder interactions. A variety of attention mechanisms may be employed as part of a transformer model.

Self-attention may be one of the components of the transformer model. The difference between attention mechanism and self-attention mechanism is that self-attention operates between representations of the same nature: e.g., all encoder states in some layer. Self-attention mechanism is a part of the transformer model where tokens interact with each other. Each token in a sense "looks" at other tokens in the sentence with an attention mechanism, gathers context, and updates the previous representation of "self". Each input token in a self-attention mechanism receives three representations: (i) query, (ii) key, and (ii) value. The query is used when a token looks at others—it is seeking the information to understand itself better. The key is responding to a query's request: it is used to compute attention weights. The value is used to compute attention output: it gives information to the tokens which "say" they need it (i.e. assigned large weights to this token).

Masked self-attention may be another component of the transformer model. The decoder usually includes this particular self-attention mechanism, and which is different from the self-attention mechanism in the encoder. While the encoder receives all tokens at once and the tokens can look at all tokens in the input sentence, in the decoder, tokens are generated one at a time—during generation, the model does not know which tokens will be generated in future. To forbid the decoder to "look ahead", the transformer model uses masked self-attention—i.e., future tokens are masked out.

Multi-head attention is a further one of the components of the transformer model. It should be noted that understanding the role of a word in a sentence requires understanding how it is related to different parts of the sentence. This is important not only in processing source sentence but also in generating targets. As a result, this type of attention mechanism may allow the transformer model to "focus of different things". Instead of having one attention mechanism, multi-head attention has several "heads" which work independently. This may be implemented as several attention mechanisms whose results are combined.

The encoder of the transformer model can include an encoder self-attention mechanism and a feedforward network block. The encoder self-attention mechanism may be a multi-head attention mechanism used for tokens to "look" at each other. The queries, keys, values are computed from encoder states. The feedforward network block receives the information from tokens and processes that information.

The decoder of the transformer model can include a decoder self-attention mechanism (masked), a decoder-encoder attention mechanism, and a feedforward network. The decoder masked self-attention mechanism may be a masked multi-head attention mechanism used for tokens to "look" at previous tokens. The queries, keys, values are computed from decoder states. The decoder-encoder attention mechanism may be a multi-head attention mechanism used for target tokens to "look" at the source information. Queries are computed from decoder states, while keys and values are computed from encoder states. The feedforward network block receives the information from tokens and processes that information.

It can be said that in the encoder, tokens communicate with each other and update their representations. It can also be said that in the decoder, a target token first looks at previously generated target tokens, then at the source, and finally updates its representation. This can be repeated in several layers. In one non-limiting implementation, this can be repeated 6 times.

As mentioned above, in addition to an attention mechanism, a given layer has a feedforward network block. For example, the feedforward network block may be represented by two linear layers with a ReLU non-linearity between them. After looking at other tokens via an attention mechanism, a model uses a feedforward network block to process this new information. The transformer model may further comprise residual connections for adding a block's input to its output. Residual connections may be used for stacking layers. In a transformer model, residual connections can be used after a respective attention mechanism and feedforward network block. For example, an "Add & Norm" layer may be provided with (i) the input of an attention mechanism via a residual connection and (ii) the output of the attention mechanism. The result of this Add & Norm layer may then be provided to a feedforward network block or another attention mechanism. In another example, an "Add & Norm" layer may be provided with (i) the input of an feedforward network block via a residual connection and (ii) the output of the feedforward network block. As alluded to above, the transformer model may comprise Add & Norm layers. Broadly speaking, such a layer can independently normalize vector representation of each example in a batch—this is done to control "flow" to the next layer. Layer normalization may improve convergence stability and sometimes even quality.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. This information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
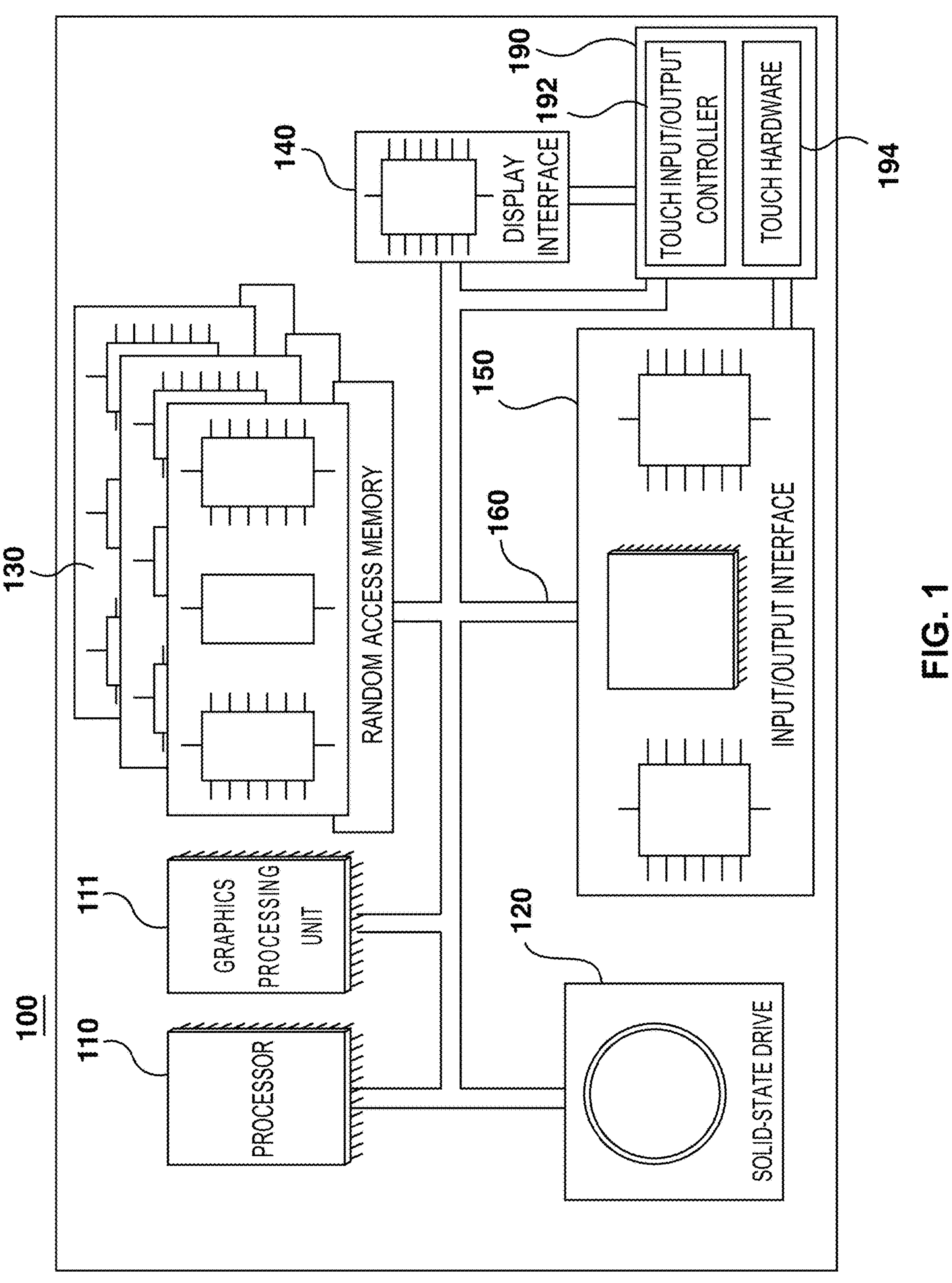
FIG. 1 depicts a schematic diagram of an example computer system for implementing certain non-limiting embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computer system 100 in addition to or instead of the touchscreen 190. In some embodiments, the computer system 100 may comprise one or more microphones (not shown). The microphones may record audio, such as user utterances. The user utterances may be translated to commands for controlling the computer system 100.

It is noted some components of the computer system 100 can be omitted in some non-limiting embodiments of the present technology. For example, the touchscreen 190 can be omitted, especially (but not limited to) where the computer system is implemented as a smart speaker device.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
FIG. 2 depicts a networked computing environment suitable for some implementations of certain non-limiting embodiments the present technology.
Figure 2:
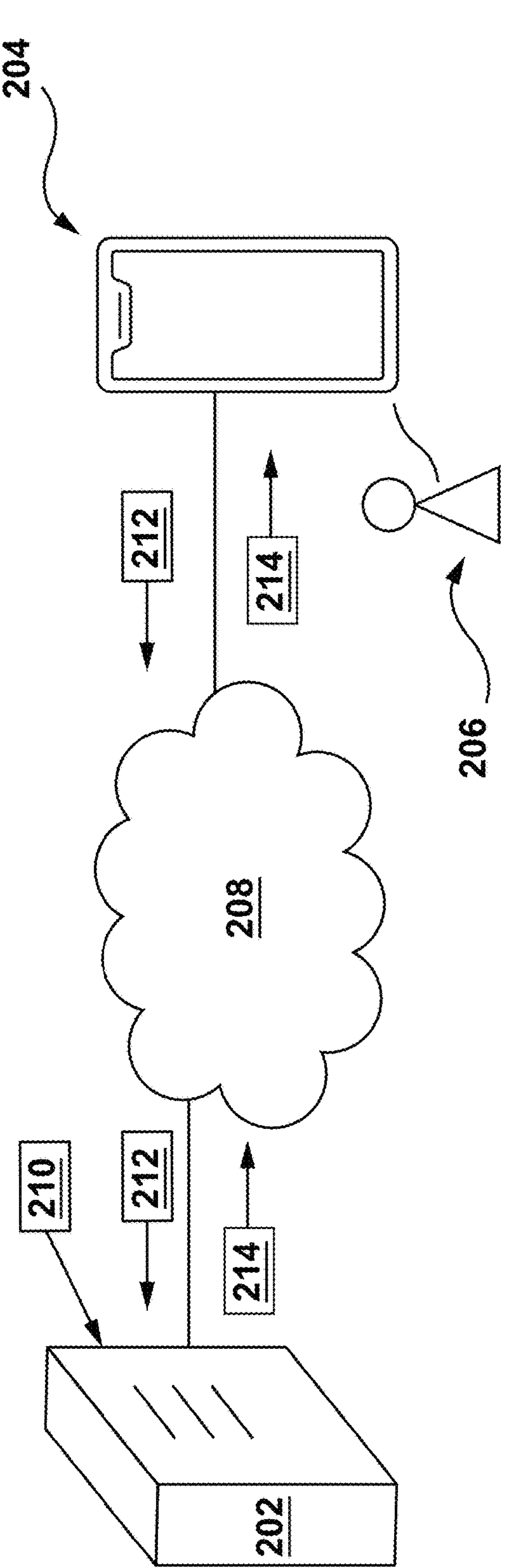

With reference to FIG. 2, there is depicted a schematic diagram of a networked computing environment 200 suitable for use with some embodiments of the systems and/or methods of the present technology. The networked computing environment 200 comprises a server 202 communicatively coupled, via a communication network 208, to an electronic device 204. In the non-limiting embodiments of the present technology, the electronic device 204 may be associated with a user 206.

In some non-limiting embodiments of the present technology, the server 202 is implemented as a conventional computer server and may comprise some or all of the components of the computer system 100 of FIG. 1. In one non-limiting example, the server 202 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 202 is a single server. In alternative non-limiting embodiments of the present technology (not depicted), the functionality of the server 202 may be distributed and may be implemented via multiple servers.

Further, the electronic device 204 may be any computer hardware that is capable of running a software appropriate to the relevant task at hand. Thus, some non-limiting examples of the electronic device 204 may include personal computers (desktops, laptops, netbooks, etc.), smartphones, and tablets. To that end, in some non-limiting embodiments of the present technology, the electronic device 204 can also comprise some or all components of the computer system 100 depicted in FIG. 1.

According to certain non-limiting embodiments of the present technology, the networked computing environment 200 can be configured for providing machine translation services to users of the communication network 208, such as the user 206.

To that end, according to certain non-limiting embodiments of the present technology, the server 202 can be configured to host a translation engine 210, which the user 206 can access using the communication network 240. For example, to access the translation engine 210, the user 206 can submit a Universal Resource Locator (URL) associated with the translation engine 210 to an address bar of a browser application (not separately labelled) of the electronic device 204. In response, the server 202 can be configured to cause the electronic device 204 to render in the browser application thereof a graphical user interface (GUI) of the translation engine 210.

Figure 3:
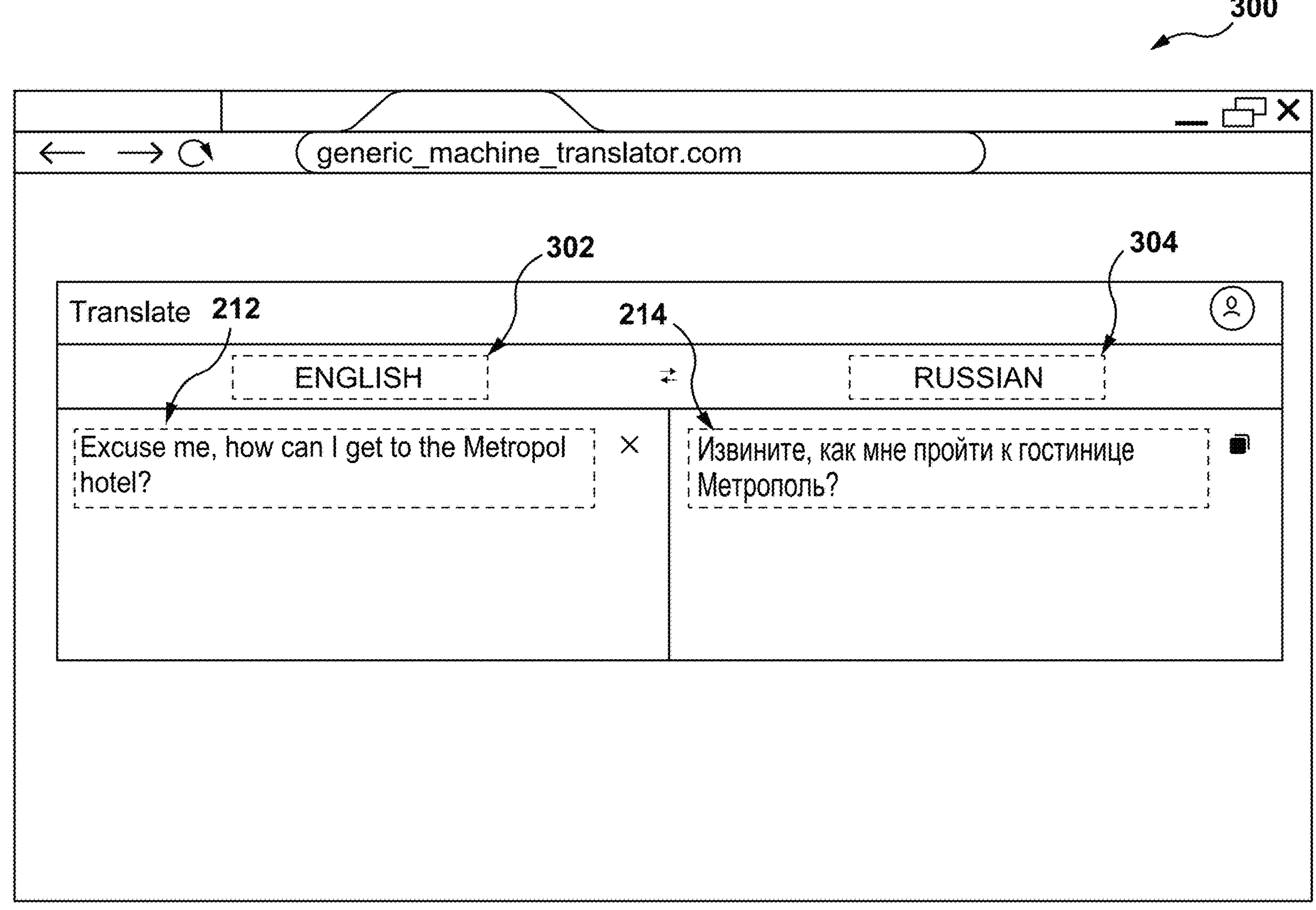
FIG. 3 depicts a schematic diagram of Graphical User Interface (GUI) of a translation engine, hosted by a server present in the networked computing environment of FIG. 2, rendered on a screen of an electronic device of same, in accordance with the non-limiting embodiments of the present technology.

With continued reference to FIG. 2 and with reference to FIG. 3, where there is depicted an translation engine GUI 300 of the translation engine 210 rendered on a screen of the electronic device, in accordance withe certain non-limiting embodiments of the present technology.

Broadly speaking, according to certain non-limiting embodiments of the present technology, the translation engine 210 is configured to translate portions of texts, such as paragraphs, sentences, word combinations, or separate words from a source language 302 (such as English, for example) into a target language 304 (such as Russian, for example). For example, the user 206, using the electronic device 204, via the translation engine GUI 300, can provide a textual representation (such as by typing it in) of a given source language phrase 212 in a text field (not separately labelled) configured to receive text in the source language 302. In response, the electronic device 204 can be configured to transmit the given source language phrase 212 to the server 202. In turn, the server 202 can be configured to receive the given source language phrase 212 and feed it to the translation engine 210, thereby causing the translation engine 210 to generate a textual representation of a respective target language phrase 214, which is a translation variant of the given source language phrase 212 into the target language 304.

It should be noted that, in some non-limiting embodiments of the present technology, the translation engine GUI 300 can be configured to enable the user 206 to provide the given source language phrase 212 differently. For example, the translation engine GUI 300 can be configured to enable the user 206 to submit an audio representation of the given source language phrase 212 to the server 202, such as by using a microphone of the electronic device 204. To that end, to convert the audio representation of the given source language phrase 212 to the textual representation thereof for further processing, the server 202 could be configured to host a speech-to text (STT) model (not separately depicted) configured to generate textual representations of user-input utterances.

Also, in some non-limiting embodiments of the present technology, aside form textual representations of the target language phrases, such as the respective target language phrase 214, the translation engine 210 can be configured to generate an audio representation of the respective target language phrase 214. To that end, in some non-limiting embodiments of the present technology, the server 202 can be configured to host a text-to-speech (TTS) model configured to generate audio representations of input text. It is not limited how the STT and TTS are implemented; and in some non-limiting embodiments of the present technology, both of them can be implemented based on neural networks, as described, for example, in a co-owned U.S. patent application Ser. No. 18/081,634, filed on Feb. 14, 2022, and entitled "METHOD AND SYSTEM FOR RECOGNIZING A USER UTTERANCE," the content of which is incorporated herein by reference in its entirety.

Further, the server 202 can be configured to transmit the respective target language phrase 214 generated by the translation engine 210 to the electronic device 204 for presentation to the use in the text field (not separately labelled) for outputting texts in the target language 304.

In specific non-limiting example, the translation engine 210 may be implemented as a Yandex™ Translate™ translation engine provided by YANDEX LLC of 16 Lev Tolstoy Street, Moscow, 119021, Russia. However, it should be noted the translation engine 210 can be implemented as any other commercial or proprietary translation engine.

In some non-limiting embodiments of the present technology, the translation engine 210 can comprise a translation machine-learning (ML) model (such as a deep neural network-based ML model) that has been trained to translate the portions of text from the source language 302 into the target language 304.

Typically, the translation ML model of the translation engine 210 can be trained based on corpora of parallel texts, that is, a first corpus of texts in the source language 302 and a second corpus of texts in target language 304. More specifically, the first and second corpora of texts are organized such that a given training source language phrase (such as a given training source language phrase 501 schematically depicted in FIG. 5) in the first corpus corresponds to a respective training target language phrase (such as a respective training target language phrase 511 schematically depicted in FIG. 5) in the second corpus, which is a translation variant of the given training source language phrase 501. Thus, based on such training digital objects, a given one of which includes (i) the given training source language phrase 501 in the first corpus of texts and (ii) the respective training target language phrase 511, the translation ML model can be trained to generate translations in the target language 304 for user-input texts in the source language 302.

In some non-limiting embodiments of the present technology, both the first and second corpora of texts and hence the training digital objects can be generated, based on texts produced by human beings. For example, in these embodiments, respective portions of both corpora can comprise at least one of: (i) fictional literature compositions; (ii) news articles; (iii) scientific papers; (iv) educational materials, and the like, that have been translated by professional human translators from the source to the target language 302, 304 or vice versa. The given training digital object generated based on such texts can, for example, include: (i) the given training source language phrase 501 reading "I recollect that wondrous meeting, that instant I encountered you . . . "; and (ii) the respective training target language phrase 511 being *"Я помню чудное мгновенье, передо мной явилась ты..."* In these embodiments, the server 202 can be configured to retrieve the first and second corpora of texts from resources available on the communication network 208. For example, the server 202 can be configured to crawl certain resources of the communication network 208 to identify thereon texts and/or portions thereof produced by human authors and human translators.

However, as demand for machine-generated translations in various industries grows, requiring translations of texts of different styles, the training examples generated based solely on human-translated texts may not be sufficient for training the translation ML model. To that end, in some non-limiting embodiments of the present technology, the server 202 can be configured to: (i) retrieve various texts in the source language 302 regardless from whether human translation therefor is available or not; and (ii) transmit these texts to a third-party translation engines (not depicted), to which the server 202 has access, for generating translations of the retrieved texts into the target language 304. Further, based on the texts in the source language 302 and the so generated translations, the server 202 can be configured to generate additional training digital objects for training the translation ML model of the translation engine 210.

Although such third-party translation engines can be comparatively efficient in providing the training data, one of the disadvantages of using them could be that translations provided thereby for the phrases of the first corpus can be inaccurate. More specifically, training digital objects generated based on such translation can include non-parallel phrases, that is, those phrases in the source and target languages 302, 304 that do not correspond to each other in meaning and/or style. For examples, continuing with the example where the source language 302 is English, for the given training source language phrase 501 reading "Please do not disturb", the third-party translation engine can generate the respective training target language phrase 511 being "*Просьба не дистербировать*". Russian speakers who also know English would appreciate that the correct translation of the given training source language phrase 501 would be: "*Просьба не беспокоить*"; however, the third-party translation engine may not be capable of determining the right Russian translation of the English word "disturb", which may hence result in the incorrect translation above. In another example, the given training source language phrase 501 can read "Max found him bleeding like a pig", and, due to not being capable of identifying idioms, that is, "bleed like a pig", which means "bleed profusely", the third-party translation engine can generate the translation of the given training source language phrase 501 being, for example: "*Макс увидел, что он истекал кровью, как поросенок*", which is a literal and incorrect translation of the above source language phrase, whereas the correct translation would be, for example: "*Макс увидел его сильно истекающим кровью*".

As it can be appreciated, by using such training digital object, the server 202 may cause the translation ML model of the translation engine 210 to learn incorrect correspondences between the training source and target language phrases and further, while using the so trained translation ML model, generate wrong and inaccurate translations of the user inputs, which may affect the overall user experience of the users from using the translation engine 210 and other services associated therewith.

To address this problem, the developers of the present technology have developed methods and system for (i) identifying, in the raw target language translations of the training source language phrases, target language phrases including inaccurate translations from the respective training source language phrases; and (ii) replacing these target language phrases with more accurate variants of translation of the respective training source language phrases. By doing so, the present methods and systems are directed to refining the raw target language translations of the training source language phrases, thereby generating higher-quality training data for training the translation ML model.

An example ML architecture of the translation ML model, as well as the method for generating the training data, and the training process of the translation ML model, in accordance with certain non-limiting embodiments of the present technology, will be described below with reference to FIGS. 4 to 6.

Communication Network

In some non-limiting embodiments of the present technology, the communication network 208 is the Internet. In alternative non-limiting embodiments of the present technology, the communication network 208 can be implemented as any suitable local area network (LAN), wide area network (WAN), a private communication network or the like. It should be expressly understood that implementations for the communication network 208 are for illustrative purposes only. How a respective communication link (not separately numbered) between each one of the server 202, the electronic device 204, and the communication network 208 is implemented will depend, inter alia, on how each one of the server 202 and the electronic device 204 is implemented. Merely as an example and not as a limitation, in those embodiments of the present technology where the electronic device 204 is implemented as a wireless communication device such as a smartphone, the communication link can be implemented as a wireless communication link. Examples of wireless communication links include, but are not limited to, a 3G communication network link, a 4G communication network link, and the like. The communication network 208 may also use a wireless connection with the server 202.

Machine-Learning Model Architecture

Figure 4:
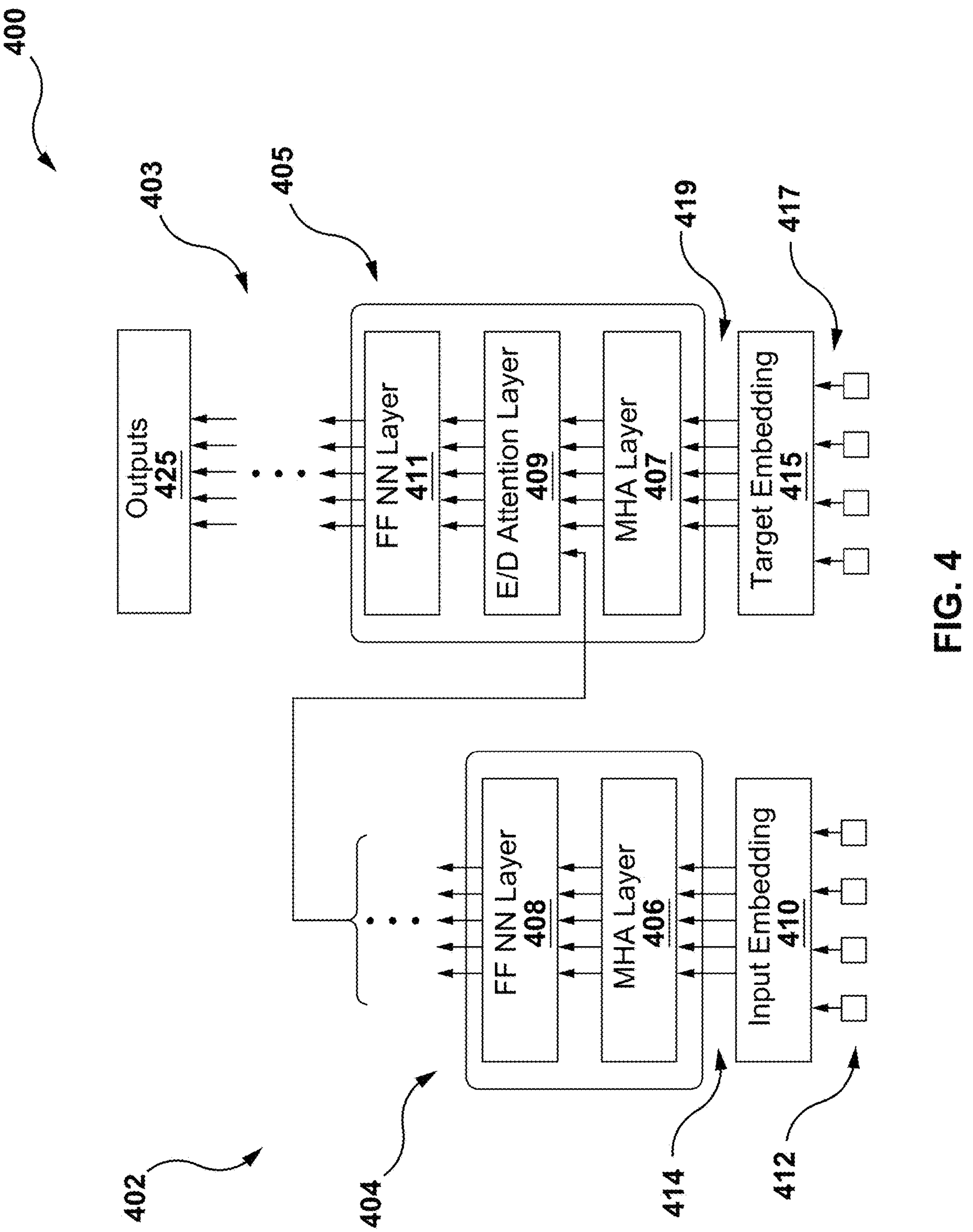
FIG. 4 depicts a schematic diagram of a machine-learning model architecture suitable for use in some non-limiting implementations of the present technology.

With reference to FIG. 4, there is depicted an ML model architecture 400 suitable for use with at least some non-limiting embodiments of the present technology. In some non-limiting embodiments of the present technology, the ML model architecture 400 is based on a Transformer neural network model architecture as described, for example, in an article by Vaswani et al. "Attention Is All You Need," and published in the Proceedings of 31$^{st}$ Conference on Neural Information Processing Systems (NIPS 2017), the content of which is incorporated herein by reference in its entirety.

Thus, the ML model architecture 400 can comprise an encoder stack of layers 402 and a decoder stack of layers 403, which can be configured to process the input data 412 and target data 417 of the ML model architecture 400, respectively.

Further, a given encoder block 404 of the encoder stack of layers 402 includes an encoder multi-head attention (MHA) layer 406 and an encoder feed-forward NN layer 408. The encoder MHA layer 406 includes dependencies between portions of the input data 412 provided thereto. For example, if the input data 412 includes text data, such as a text sentence, the encoder MHA layer 406 may include dependencies between words of the sentence. In another example, where the input data 412 to the encoder stack of layers 402 includes an audio signal, such as that representing a human utterance, the encoder MHA layer 406 may include dependencies between certain sounds and/or acoustic features of the human utterance. Such dependencies can be used by the encoder MHA layer 406 for determining contextual information of a given portion of the input data 412 to the encoder stack of layers 402 (such as that representative of a given word of the sentence) relative to another portion of the input data 412.

Further, the encoder feed-forward NN layer 408 is configured to transform data input thereto from the encoder MHA layer 406 into a format receivable by one or more following layers of the ML model architecture 400, such as an encoder-decoder MHA layer 409, as will be described below. The encoder feed-forward NN layer 408 generally lacks dependencies of the encoder MHA layer 406, and thus the inputs to the encoder feed-forward NN layer 408 may be processed in parallel.

Further, the input data 412 to the encoder stack of layers 402 can be represented by a plurality of input vectors 414 generated by an input embedding algorithm 410. Generally speaking, the input embedding algorithm 410 is configured to generate fixed-dimensional vector embeddings of the input data 412 in a respective vector embedding space. In other words, if the input data 412 comprise text data, the input embedding algorithm 410 can be configured to generate the plurality of input vectors 414, where coordinates of vector embeddings representative of words of the text sentence similar in meaning are positioned closer to each other in the respective embedding space. Thus, the input embedding algorithm 410 can be implemented as a text embedding algorithm including, without limitation, one of a Word2Vec text embedding algorithm, a GloVe text embedding algorithm, and the like.

Thus, a given one of the plurality of input vectors 414 can include numerical values, such as 768 floating point values, as an example, representative of a respective portion of the input data 412, such as a word, a portion of the given human request 212, and the like.

Also, the generating the plurality of input vectors 414 can further include applying a positional embedding algorithm (not depicted) configured to register positional information within portions of the input data 412. For example, if the input data 412 includes a text sentence, the positional embedding algorithm can be configured to generate a vector indicative of positional information amongst words in that text sentence. In other words, the positional embedding algorithm can be configured to generate the vector retaining contextual information within the input data 412, which can further be added to the plurality of input vectors 414. It is not limited how the positional embedding algorithm is implemented; and may include, without limitation, a sinusoid positional embedding algorithm, a frame stacking positional embedding algorithm, and a convolutional positional embedding algorithm, as an example.

It should be noted that the encoder stack of layers 402 can include multiple encoder blocks, such as 6 or 12, for example, implemented similarly to the given encoder block 404.

Further, a given decoder block 405 of the decoder stack of layers 403 of the ML model architecture 400 also includes (i) a decoder MHA layer 407; and (ii) a decoder feed-forward NN layer 411, which can generally be implemented in a similar fashion to the encoder MHA layer 406 and the encoder feed-forward NN layer 408, respectively. However, the architecture of the given decoder block 405 differs from that of the given encoder block 404 in that that the given decoder block 405 additionally includes the encoder-decoder MHA layer 409. The encoder-decoder MHA layer 409 is configured to (i) receive input vectors from the encoder stack of layers 402 and from the decoder MHA layer 407;

and thus (ii) determine, during a training process dependencies between the input data 412 and the target data 417 (such as text data, for example) of the ML model architecture 400 input to the decoder stack of layers 403. In other words, outputs of the encoder-decoder MHA layer 409 are attention vectors including data indicative of relationships between respective portions of the input data 412 and the target data 417.

Similar to the input data 412, for feeding the target data 417 to the given decoder block 405, a target embedding algorithm 415 can be applied to the target data 417 for generating a plurality of target vectors 419 comprising numerical representations of respective portions of the target data 417.

As it can be appreciated, in those embodiments where the target data 417 is the text data, the target embedding algorithm 415 can be implemented in a similar fashion to the input embedding algorithm 410. Additionally, the positional algorithm can also be applied to the plurality of target vectors 419 for registering positional data amongst portions of the target data 417, as described above with respect to the plurality of input vectors 414.

As will become apparent from the description provided hereinbelow, the ML model architecture 400 can be configured to receive the input data 412 and the target data 417 from a digital object, such as one of a given training digital object including the given training source language phrase 501 and the respective training target language phrase 511, respectively, as will be described with refence to FIGS. 5 and 6.

Similarly, it should be noted that the decoder stack of layers 403 can include multiple decoder blocks, such as 6 or 12, for example, implemented similarly to the given decoder block 405. In some non-limiting embodiments of the present technology, the ML model architecture 400 can include only the encoder stack of layers 402, that is, devoid of any decoder blocks, having, for example, 12, 24, or 36 encoder blocks implemented similarly to the given encoder block 404 described above. In this case, the ML model architecture 400 can be referred to as a Bidirectional Encoder Representations from Transformers (BERT) model.

In other non-limiting embodiments of the present technology, the ML model architecture 400 can include only the decoder stack of layers 403, that is, devoid of any encoder blocks, having, for example, 12, 24, or 36 decoder blocks implemented similarly to the given decoder block 405 described above. In this case, the ML model architecture 400 can be referred to as a Generative Pre-Trained Transformer (GPT) model.

Also, as it can be appreciated, after the training the ML model architecture 400, each block of the encoder stack of layers 402 and the decoder stack of layers 403 will have different weights contributing to the generation of the output data 425. For adjusting the weights during the training process, a backpropagation algorithm can be applied to the ML model architecture 400, and a difference between the input data 412 and the output data 425 can be determined and further optimized. Such difference can be expressed by a loss function, such as a Cross-Entropy Loss Function.

It should be expressly understood that other implementations of the loss function are also envisioned by the non-limiting embodiments of the present technology and may include, by way of example, and not as a limitation, a Mean Squared Error Loss function, a Huber Loss function, a Hinge Loss function, and others.

Also, it is not limited how the server 202 can be configured to optimize the loss function, and in some non-limiting embodiments of the present technology, will depend generally on the differentiability of the loss function. For example, if the loss function is continuously differentiable, approaches to minimizing it can include, without limitation, a Gradient Descent algorithm, a Newton's optimization algorithm, and others. In those embodiments where the loss function is non-differentiable, to minimize it, the server 202 can be configured to apply at least one of a Direct algorithms, Stochastic algorithms, and Population algorithms, as an example.

The output data 425 of the ML model architecture 400 can include an output vector corresponding to a given one of the plurality of input vectors 414 and/or the plurality of target vectors 419. For example, as will become apparent from the description below, in those embodiments, where the input data 412 to the ML model architecture 400 includes the textual representation of the given source language phrase 212, the output vector can include probabilities indicative of the textual representation of the respective target language phrase 214.

It will be understood that the ML model architecture 400 described with reference to FIG. 4 has been greatly simplified for ease of understanding; and an actual implementation of the ML model architecture 400 may include additional layers and/or blocks, as described, for example, in the Vaswani et al. article referenced above. For example, in some implementations of the ML model architecture 400, each of the given encoder block 404 and the given decoder block 405 may also include layer normalization operations. Additionally, generating the output data 425 may include applying a softmax normalization function at an output of the decoder stack of layers 403, and so on. One of ordinary skill in the art would understand that these operations are commonly used in neural networks and deep learning models such the ML model architecture 400.

Translation ML Model

As mentioned hereinabove, the translation ML model of the translation engine 210 can be configured to translate user-input text from the source language 302 into the target language 304, such as the respective target language phrase 214 for the given source language phrase 212, as described above with reference to FIG. 3.

In some non-limiting embodiments of the present technology, the translation ML model can be implemented based on a neural network (NN), such as a LSTM NN or a recurrent NN. However, according to certain non-limiting embodiments of the present technology, the translation ML model can be implemented as a Transformer-based NN model. To that end, the translation ML model can include some or all the components of the ML model architecture 400 described above.

Overall, according to certain non-limiting embodiments of the present technology, the server 202 can be configured to execute two respective processes in respect of the translation ML model of the translation engine 210. A first process of the two processes is a training process, where the server 202 is configured to train the translation ML model, based on a training set of data, to generate the respective target language phrase 214, which will be discussed below. A second process is an in-use process, where the server 202 is configured to apply the so-trained translation ML model to the user-input source language phrases, such as the given source language phrase 212, in accordance with certain non-limiting embodiments of the present technology, further below.

Training Process

As alluded to above, the server 202 can be configured to train the translation ML model to generate translations of the user-input source language phrases based on training digital objects, a given one of which includes a pair of (i) the given training source language phrase 501 and (ii) an example translation (variant) of the given training source language phrase 501 into the target language 304, such as the respective training target language phrase 511 or other variants, as will be described below.

According to certain non-limiting embodiments of the present technology, to generate the training set of data for training the translation ML model the server 202 can be configured to: (i) obtain the first corpus of texts in the source language 302; and (ii) obtain the second corpus of texts in the target language 304, phrases of which form parallel pairs with phrases of the first corpus of texts; and (iii) modify the second corpus of texts by identifying therein non-parallel phrases and replacing the non-parallel phrases with more accurate translation variants of respective training source language phrases from the first corpus. To do so, in some non-limiting embodiments of the present technology, the server 202 can be configured to host (or otherwise have access to over the communication network 208) additional translation ML models.

Figure 5:
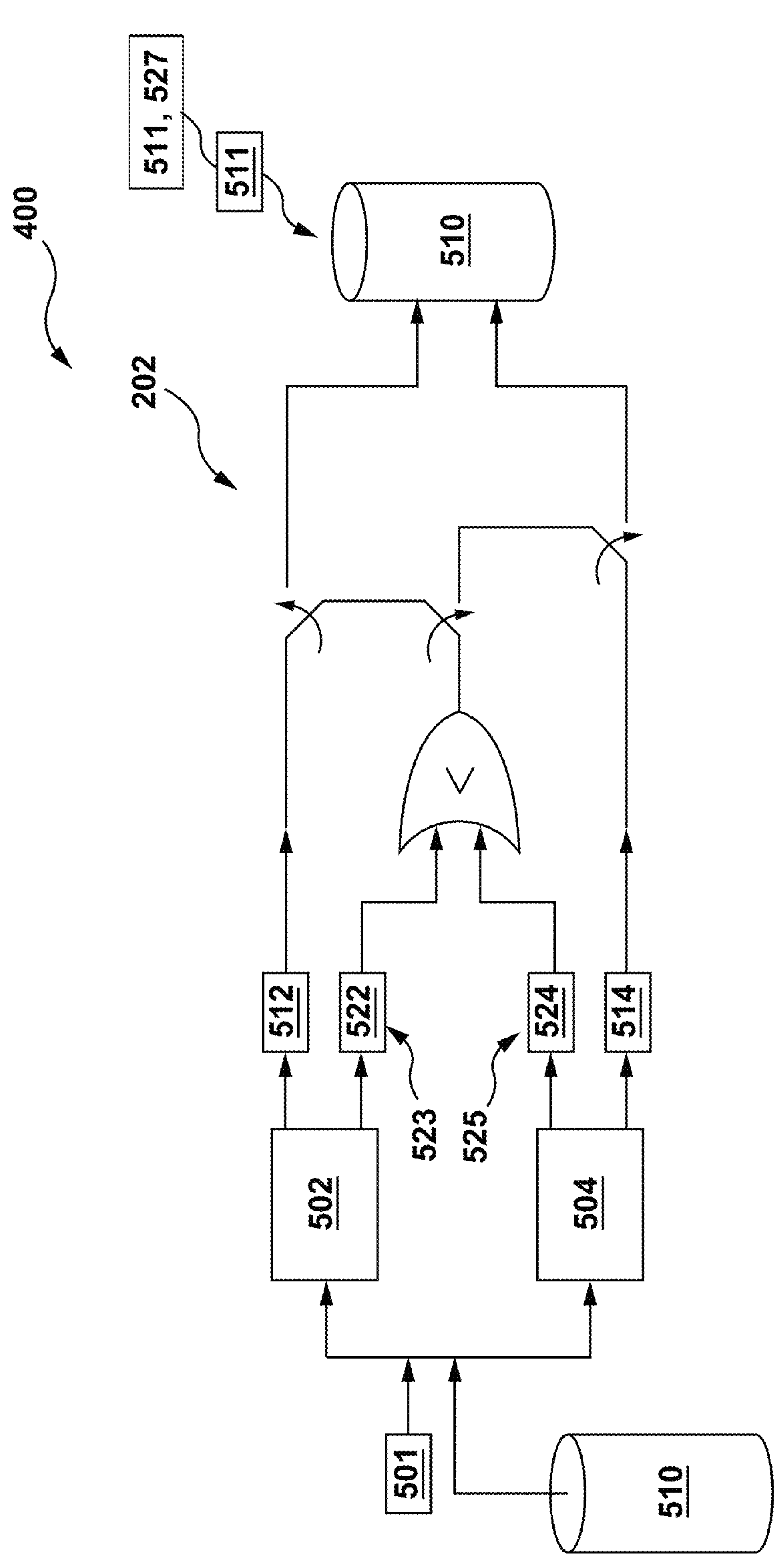
FIG. 5 depicts a schematic diagram for a step for determining, by the server of the networked computing environment of FIG. 2, using two additional translation machine-learning (ML) models, training target language translations for source language phrases that can further be used for training the translation engine, in accordance with certain non-limiting embodiments of the present technology.
Figure 6:
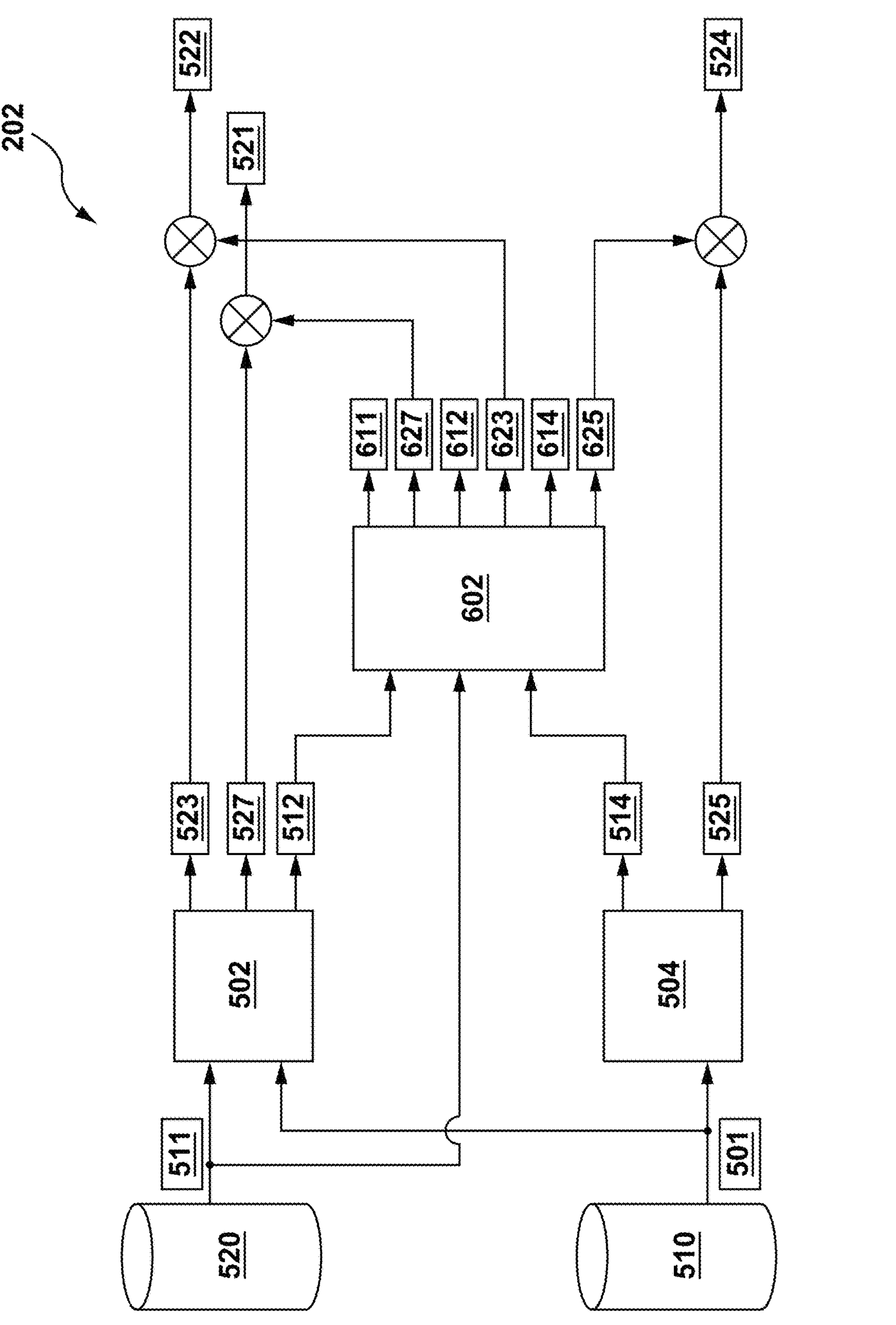
FIG. 6 depicts a schematic diagram for a step of determining, by the server of the networked computing environment of FIG. 2, confidence scores of training target language translations generated by the additional ML models of FIG. 5, in accordance with certain non-limiting embodiments of the present technology.

With reference to FIG. 5, there is depicted a schematic diagram for a step for generating the training set of data for training the translation ML model of the translation engine 210, in accordance with certain non-limiting embodiments of the present technology.

According to certain non-limiting embodiments of the present technology, the server 202 can be configured to host (or otherwise have access to) an input database 510 where the server 202 can be configured to store training source language phrases of the first corpus of texts in the source language 302, such as the given training source language phrase 501. It is not limited how the server 202 can be configured to populate the input database, and can include, for example, crawling resources of the communication network 208 having text content in the source language 302, which may include, without limitation: posts and messages of social networks (such as a VK.COM™ social network); news and documentary articles of news and information media sources (such as a Yandex.News™ news portal, a Rambler™ news portal, and the like); articles of published by certain reference resources (such as a Wikipedia™ online encyclopedia, a Britannica™ online encyclopedia, and the like); pieces of fictional literature access to which is provided by open online libraries (such as a LIB.RU™ online library, a Z-Library™ online library, and the like); comments of users of online video hosting platforms (such as a RUTUBE™ online video hosting platform) and online audio hosting platforms (such as a Yandex.Music™ online audio hosting platform); and others. It should be expressly understood that other forms of the texts in the source language 302 can be included in the first corpus of texts for generating the training set of data for the translation ML model without departing from the scope of the present technology.

Further, in some non-limiting embodiments of the present technology, the server 202 can be configured to host (or otherwise have access to) an output database 520 which is configured to store training target language phrases of the second corpus of texts in the target language 304. As mentioned hereinabove, each one of the training target language phrases, such as the respective training target language phrase 511, is a translation of a respective training source language phrase, that is, the given training source language phrase 501, from the source language 302 into the target language 304. As mentioned further above, in some non-limiting embodiments of the present technology, the output database 520 can be initially populated by training target language phrases that have been obtained as translations of the respective training source language phrases determined either by human beings or by the third-party translation engines.

Also, in some non-limiting embodiments of the present technology, the server 202 can be configured to obtain the respective training target language phrase 511 associated with a base confidence score 521, indicative of translation accuracy of the respective training target language phrase 511 from the source language 302. However, in other non-limiting embodiments of the present technology, the server 202 can be configured to: (i) obtain the respective training target language phrase 511 as mentioned above; and (ii) determine the base confidence score 521 thereof, as will be described below.

Further, as it can be appreciated from FIG. 5, aside from the translation ML model of the translation engine 210, in some non-limiting embodiments of the present technology, the server 202 can be configured to have access to a first translation ML model 502 and a second translation ML model 504. According to certain non-limiting embodiments of the present technology, each of the first and second translation ML models 502, 504 have been pre-trained (or otherwise configured) to translate the texts from the source to the target language 302, 304. For example, each one of the first and second translation ML models 502, 504 can be pre-trained by the third-party translation engine, as described above with reference to FIG. 3. In some non-limiting embodiments of the present technology, each one of the first and second translation ML models 502, 504 could be trained based on training sets of data that are at least partially different. Also, it is not limited how the first and second translation ML models 502, 504 can be implemented, and in some non-limiting embodiments of the present technology, each one of the first and second translation ML models can be implemented based on the ML model architecture 400 described above.

In some non-limiting embodiments of the present technology, the first translation ML model 502 can be configured to generate direct translations of the texts from the source to the target language 302, 304. In the context of the present specification, by "direct" translations are meant translations that are generated by a given translation ML model, such as the first translation ML model 502, directly from the source to the target language 302, 304, without generating any intermediate translations of the input source language phrases into other languages.

By contrast, in some non-limiting embodiments of the present technology, the second translation ML model 504 can be configured to generate the translations via an intermediate target language (not separately marked), different from the source and target languages 302, 304. More specifically, according to certain non-limiting embodiments of the present technology, the second translation ML model 504 can be configured to translate the given source language 212, first, from the source language 302 into the intermediate target language, and then, from the intermediate target language into the target language 304. Akin to the source and target languages 302, 304, the intermediate target language can be any natural language that has ever been used for human communication, such as German, French, Mandarin, and others.

In some non-limiting embodiments of the present technology, the second translation ML model 504 can comprise two sequentially connected translation ML models: a first one, which is configured to translate the input texts from the source language 302 to the intermediate target language; and a second one, which is configured to translate the input texts from the intermediate target language to the target language 304. For example, these components of the second translation ML model 504 can be implemented based on the ML model architecture 400 described above.

Also, in some non-limiting embodiments of the present technology, each one of the first and second translation ML models 502, 504 is different form the translation ML model of the translation engine 210. However, in other non-limiting embodiments of the present technology, one of the first and second translation ML models 502, 504, such as the first translation ML model 502 can be the same as the translation ML model of the translation engine 210 that has been pre-trained to translate the user-input source language phrases from the source to the target language 302, 304. In these embodiments, instead of training the translation ML model "from scratch", the server 202 can be configured to fine-tune the translation ML model, based on the training set of data, to generate more accurate translations into the target language 304.

Thus, in some non-limiting embodiments of the present technology, the server 202 can be configured to: (i) access the input database 510 to retrieve therein the given training source language phrase 501; (ii) feed the given training source language phrase 501 to the first translation ML model 502 to generate a first target language translation variant 512 of the given training source language phrase 501 into the target language 304; and (iii) feed the given training source language phrase 501 to the second translation ML model 504 to generate a second target language translation variant 514 of the given training source language phrase 501 into the target language 304. Further, the server 202 can be configured to: (i) determine if one of the first target language translation variant 512 and the second target language translation variant 514 is of higher accuracy than the respective training target language phrase 511; and (ii) in response to the one of the first and second target language translation variants 512, 514 being of higher accuracy than the respective training target language phrase 511, replace the respective training target language phrase 511 in the second corpus of texts stored in the output database 520 with the one of the first and second target language translation variants 512, 514. Else, in some non-limiting embodiments of the present technology, the server 202 can be configured to keep the respective training target language phrase 511 in the second corpus of texts.

By doing so, the server 202 can be configured to determine the training target language phrases that are closer in meaning to the respective training source language phrases, thereby modifying the second corpus of texts in the target language 304. Further, the server 202 can be configured to use the so modified second corpus of texts for generating the training set of data for the translation ML model of the translation engine 210. The training set of data is hence believed to be of greater quality than the one which would have been generated based on the initially obtained second corpus of texts, without identifying and replacing less accurate training target language phrases.

In some non-limiting embodiments of the present technology, the server 202 can be configured to determine a more accurate training target language phrase from the respective training target language phrase 511 and the first and second target language translation variants 512, 514 for inclusion in the second corpus based on associated confidence scores, indicative of accuracy of each target language translation variant—that is, the base confidence score 521, a first confidence score 522, and a second confidence score 524, respectively.

In some non-limiting embodiments of the present technology, the server 202 can be configured to determine a given confidence score of the base, first, and second confidence scores 521, 522, 524 as being respective direct confidence scores, generated by one of translation ML models configured to translate from the source to the target language 302, 304, such as the first ML model 502.

More specifically, in those embodiments where the first translation ML model 502, is based on the ML model architecture 400, to determine, for example, a base direct confidence score 527, indicative of a direct translation accuracy of the respective training target language phrase 511, the server 202 can be configured to use a pre-built token vocabulary of the first translation ML model 502 to determine, for a given language unit of the respective training target language phrase 511 (such as a morpheme, a word, or a word combination), a respective likelihood value that the given language unit is a "best" match to a preceding language unit in the respective training target language phrase 511. In other words, using the pre-built token vocabulary of the first translation ML model 502, the server 202 can be configured to determine the likelihood values of each of the language units making up the respective training target language phrase 511 being positioned contextually and grammatically correctly in the respective training target language phrase 511 relative to other language units. Further, to determine the base direct confidence score, the server 202 can be configured to aggregate (such as by summating, for example) the respective likelihood values associated with each one language unit of the respective training target language phrase 511.

Similarly, using the first translation ML model 502, the server 202 can be configured to determine: (i) a first direct confidence score 523, indicative of the direct translation accuracy of the first target language translation variant 512; and (ii) a second direct confidence score 525, indicative of the direct translation accuracy of the second target language translation variant 514. Alternatively, in other non-limiting embodiments of the present technology, to determine the second direct confidence score 525, the server 202 can be configured to use the second translation ML model 504, as schematically depicted in FIG. 5.

However, in other non-limiting embodiments of the present technology, the server 202 can be configured to determine the base, the first, and second confidence scores 521, 522, and 524 differently. With reference to FIG. 6, there is depicted a schematic diagram for an alternative non-limiting embodiment of a step of determining the base, first, and second confidence scores 521, 522, and 524 associated with the respective training target language phrase 511 and the first and second target translation variants 512, 514, respectively, in accordance with certain non-limiting embodiments of the present technology.

More specifically, according to certain non-limiting embodiments of the present technology, the server 202 can be configured to determine a given confidence score of the base, first, and second confidence scores 521, 522, 524 as a combination of the respective direct and inverse confidence scores of the respective one of the respective training target language phrase 511 and the first and second target language translation variant 512, 514, respectively.

To that end, according to certain non-limiting embodiments of the present technology, the server 202 can be configured to host (or otherwise have access to) a third translation ML model 602 to generate translations of texts from the target into the source language 304, 302. Needless to mention that the third translation ML model can be implemented in a similar manner, mutatis mutandis, as the first and second translation ML models 502, 504.

Thus, after determining the base direct confidence score 527, to determine the base confidence score 521, in some non-limiting embodiments of the present technology, the server 202 can be configured to feed the respective training target language phrase 511 to the third translation ML model 602 to generate a base inverse translation variant 611 of the respective training target language phrase 511 into the source language 302 and a base inverse confidence score 627 of the base inverse translation variant 611. For example, in those embodiments where the third translation ML model 602 is implemented based on the ML model architecture 400, the server 202 can be configured to determine the base inverse confidence score 627 using the pre-built token vocabulary of the third translation ML model 602, similarly as described above with respect to determining the base direct confidence score 527.

Similarly, in some non-limiting embodiments of the present technology, after determining the first and second target language translation variants 512, 514 and the first and second direct confidence scores 523, 525 thereof, to determine the first and second confidence scores 522, 524, the server 202 can further be configured to feed each one of the first and second target language translation variants 512, 514 to the third translation ML model 602 to generate: (i) a first inverse translation variant 612 of the first target language translation variant 512 into the source language 302 and a first inverse confidence score 623 of the first inverse translation variant 612; and (ii) a second inverse translation variant 614 of the second target language translation variant 514 into the source language 302 and a second inverse confidence score 625 of the second inverse translation variant 614.

Further, the server 202 can be configured to determine: (i) the base confidence score 521 of the respective training target language phrase 511 as being a combination of the base direct and inverse confidence scores 527, 627; (ii) the first confidence score 522 of the first target language translation variant 512 as being a combination of the first direct and inverse confidence scores 523, 623; and (iii) the second confidence score 524 of the second target language translation variant 514 as being a combination of the second direct and inverse confidence scores 525, 625. It is not limited how the server 202 can be configured to determine the combination of a given pair of direct and inverse confidence scores; and in some non-limiting embodiments of the present technology, the combination can include various mathematical operations such as one of a sum, a difference, a multiplication, a sum of squares, a difference of squares, absolute sums and difference, and the like.

For example, let it be assumed that the given training source language phrase 501 reads "London is the capital of Great Britain, a great modern city that inherits a spirit of old times," and the respective training target language phrase 511 associated therewith reads: "*Лондон - столица Великобритании великого современного города, который наследует дух старых времен*". First, the server 202 can be configured to determine the base direct confidence score 521 being −5.56. Further, the server 202 can be configured to feed the respective training target language phrase 511 to the third translation ML model 602 to generate the base inverse translation variant 611 reading: "London is the capital of Britain, a great modern city that inherits the spirit of old times" with the base inverse confidence score 627 being −24.63.

Similarly, based on the given training source language phrase 501, the first translation ML model 502 can be configured to generate the first target translation variant 512 reading "*Лондон – столица Великобритании, великий современный город, унаследовавший дух древних времён*" with the first direct confidence score 523 being −4.47. In turn, the second translation ML model 504 can be configured to generate the second target translation variant 514 reading "*Лондон – столица Великобритании великий современный город унаследовавший дух старины*" with the second direct confidence score 525 being −5.37. Further, the server 202 can be configured to feed the first and second target language translations 512, 514 to the third translation ML model 602, causing the third translation ML model 602 to generate: (1) the first inverse translation variant 612 reading: "London is the capital of Great Britain, a great modern city that has inherited the spirit of ancient times" with the first inverse confidence score 623 being −20.54; and (2) the second inverse translation variant 614 reading: "London—the capital of Great Britain, a great modern city that has inherited the spirit of antiquity" with the second inverse confidence score 625 being −19.15.

Thus, the server 202 can be configured to determine the base, first, and second confidence scores 521, 522, and 524, for example, by determining sums of the respective direct and inverse confidence scores. In other words, the server 202 can be configured to determine: (i) the base confidence score 521 as being a sum of the base direct and inverse confidence scores 527, 627, which is equal to −30.19; (i) the first confidence score 522 as being a sum of the first direct and inverse confidence scores 523, 623, which is equal to −25.01; and (ii) the second confidence score 524 as being a sum of the second direct and inverse confidence scores 525, 625, which is equal to −24.52.

Returning to FIG. 5, once the server 202 has determined the base, first, and second confidence scores 521, 522, 524 respectively associated with each one of the respective training target language phrase 511 and the first and second target language translation variants 512, 514, the server 202 can be configured to determine whether there is a more accurate target translation variant to replace the respective training target language phrase 511 with in the second corpus of texts in the target language 304.

For example, first, the server 202 can be configured to select one of the first and second confidence scores 522, 524 for further comparison with the base confidence score 521. Continuing with the present example where the given training source language phrase 501 reads "London is the capital of Great Britain, a great modern city that inherits a spirit of old times," in response to determining that the second confidence score 524 (−24.52) is greater than the first confidence score 522 (−25.01), the server 202 can further be configured to compare the second confidence score 524 to the base confidence score 521. Thus, as illustrated by the present example, in response to determining that the second confidence score 524 (−24.52) is greater than the base confidence score 521 (−30.19), the server 202 can be configured to replace, in the second corpus of texts, the respective training target language phrase 511 with the second target language translation variant 514 as being a more accurate translation variant of the given training source language phrase 501. By contrast, if the base confidence score 521 were greater or equal to any one of the first and second confidence scores 522, 524, the server 202 would keep the respective training target language phrase 511 for further generating the training set of data.

In some non-limiting embodiments of the present technology, the server 202 can be configured to replace, in the second corpus of texts, the respective training target language phrase 511 with one of the first and second target language translation variants 512, 514 of the given training source language phrase 501 if a respective one of the first and second confidence scores 522, 524 is greater than the base confidence score 521 by a predetermined threshold difference value, such as 3, 5, or 10, as an example.

Thus, having modified and stored, in the output database 520, the second corpus of texts, each training target language phrase of which is a more accurate translation of the respective training source language phrase of the first corpus of texts from the source into the target language 302, 304, in some non-limiting embodiments of the present technology, the server 202 can be configured to generate the plurality of training digital objects for training the translation ML model of the translation engine 210 to translate the user-input texts provided in the source language 302, such as the given source language phrase 212 mentioned above, into the target language 304. Returning to the above example where the given training source language phrase 501 read "London is the capital of Great Britain, a great modern city that inherits a spirit of old times,", the server 202 can be configured to generate the given training digital object including: (i) the given training source language phrase 501; and (ii) the second target language translation variant 514.

For training the translation ML model of the translation engine 210, the server 202 can be configured to feed each one of the plurality of training digital objects to the translation ML model. For example, in the embodiments where the translation ML model is implemented based on the ML model architecture 400 described above, having both the encoder and decoder stacks of layers 402, 403, for feeding the given training digital object to the translation ML model, the server 202 can be configured to (i) feed the given training source language phrase 501 to the encoder stack of layers 402 as part of the input data 412; and (ii) feed the second target language translation variant 514 to the decoder stack of layers 403 as part of the target data 417.

Further, at each training iteration, the server 202 can be configured to optimize a difference between the second target language translation variant 514 and a current training translation of the given source language phrase 501, generated by the translation ML model, based on the given training digital object, in the outputs 425. As mentioned hereinabove, in some non-limiting embodiments of the present technology, this difference can be defined by the loss function, examples of and approaches to optimizing which are non-exhaustively listed above. Further, using the back-propagation algorithm, at each training iteration, the server 202 can be configured to adjust the weights of the translation ML model, thereby training the translation ML model to generate translations of the user-input source language phrases from the source to the target language 302, 304—such as the respective target language phrase 214 generated as the translation of the given source language phrase 212.

As mentioned hereinabove, in those non-limiting embodiments of the present technology where the translation ML model of the translation engine 210 is the first translation ML model 502, for example, by executing the above steps of feeding the plurality of training digital objects to the translation ML model and further optimizing the loss functions at each training iteration, the server 202 can be configured to fine-tune the translation ML model to generate translations of the user-input source language phrases into the target language 304.

Thus, by executing the training process described above, the server 202 can be configured to modify the second corpus of texts by identifying therein non-parallel sentences and replacing such sentences with more accurate translations of training source language phrases, thereby allowing generating higher-quality training digital objects. This, in turn, may allow training the translation ML model to generate more accurate translations of the user-input source language phrases than those provided by the third-party translation engine mentioned above, as will be described immediately below.

In-Use Process

After training the translation ML model of the translation engine 210, the server 202 can be configured to use it for generating translation of the user-input source language phrases into the target language 304, such as respective target language phrase 314 responsive to the given source language phrase 212, as described above with reference to FIG. 3.

More specifically, in the embodiments where the translation ML model is based on the ML model architecture 400, the server 202 can be configured to feed the given source language phrase 212 to the encoder stack of layers 402 as part of the input data 412, thereby causing the translation ML model to generate the output data 425 including the output vector including probabilities indicative of the textual representation of the respective target language phrase 214.

The so generated respective target language phrase 214 is believed of higher accuracy than the one that would have been generated by the translation ML model trained based on second corpus of texts without being modified, as described above, which may improve the user experience of the user 206 from interacting with the translation engine 210.

METHOD

Figure 7:
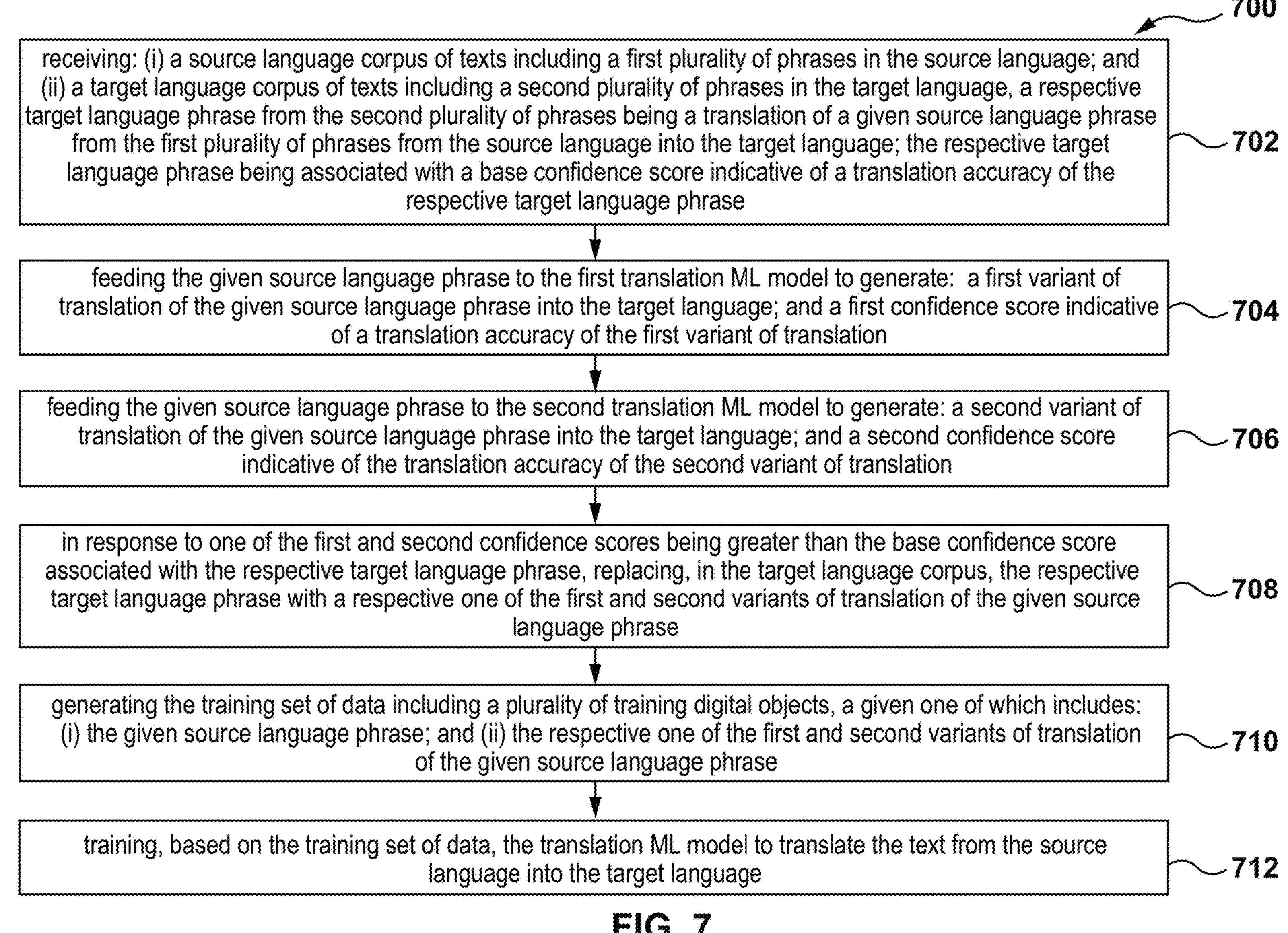
FIG. 7 depicts a flow chart of a method for generating, by the server of the networked computing environment of FIG. 2, the training set of data for training the translation engine, in accordance with the non-limiting embodiments of the present technology.

Given the architecture and the examples provided hereinabove, it is possible to execute a method for generating a training set of data for training a translation ML model, such as that of the translation engine 210 mentioned above. With reference now to FIG. 7, there is depicted a flowchart of a method 700, according to the non-limiting embodiments of the present technology. The method 700 can be executed by the server 202.

Step 702: Receiving: (I) a Source Language Corpus of Texts Including a First Plurality of Phrases in the Source Language; and (II) a Target Language Corpus of Texts Including a Second Plurality of Phrases in the Target Language The method 700 commences at step 702 with the server 202 being configured to receive the first corpus of texts in the source language 302 and the second language of texts in the target language 304. For example, as described above with reference to FIGS. 5 and 6, the server 202 can be configured to receive the first and second corpora of texts from the input and output databases 510, 520, respectively, that have been pre-populated therewith.

More specifically, the first corpus of texts includes the training source language phrases, such as the given training source training language phrase 501, and the second corpus of texts includes the corresponding training target language phrases, such as the respective training target language phrase 511. As mentioned above, the respective training target language phrase 511 is a translation variant of the given training source language phrase 501 from the source to the target language 302, 304, which can be obtained either from a human being (such as an author or human translator) or one of the third-party translation engine.

In some non-limiting embodiments of the present technology, the server 202 can obtain the respective training target language phrase 511 with the base confidence score 521, which is indicative of the translation accuracy of the respective training target language phrase 511. However, in other non-limiting embodiments of the present technology, as described further above with reference to FIGS. 5 and 6, the server 202 can be configured to determine the base confidence score 521 for the respective training target language phrase 511 using one of translation ML models, such as the first translation ML model 502, which is configured for direct translation of texts from the source to the target language 302, 304.

As described in detail hereinabove with reference to FIG. 5, in some non-limiting embodiments of the present technology, the server 202 can be configured to determine, using the first translation ML model 502, the base confidence score 521 as being the base direct confidence score 527. However, in other non-limiting embodiments of the present technology, as explained above with reference to FIG. 6, the server 202 can be configured to: (i) determine, using the first translation ML model 502, the base direct confidence score 527 associated with the respective training target language phrase 511; (ii) determine, using the third translation ML model 602, configured to generate translation of texts from the target to the source language 304, 302, the base inverse confidence score 627 associated with the base inverse translation variant 611 of the respective training target language phrase 511; and (ii) determine the base confidence score 521 as being a combination, such as a sum, of the base direct and inverse confidence scores 527, 627.

The method 700 hence advances to step 704.

Step 704: Feeding the Given Source Language Phrase to the First Translation Ml Model to Generate: A First Variant of Translation of the Given Source Language Phrase into the Target Language; and a First Confidence Score Indicative of a Translation Accuracy of the First Variant of Translation At step 704, according to certain non-limiting embodiments of the present technology, the server 202 can be configured to feed the given training source language phrase 501 to the first translation ML model 502 to generate the first target language translation variant 512 of the given training source language phrase 501. As mentioned above, the first translation ML model 502 has been pre-trained for direct translation of texts from the source to the target language 302, 304. In other words, the first translation ML model 502 can be configured to generate translations from the source to the target language 302, 304 without any intermediate translation into a third language. In some non-limiting embodiments of the present technology, the first translation ML 502 model can be implemented based on the ML model architecture 400 described in detail above with reference to FIG. 4.

Further, the server 202 can be configured to determine, for the first target language translation variant 512, the first confidence score 522 indicative of the translation accuracy of the first target language translation variant 512. According to certain non-limiting embodiments of the present technology, the server 202 can be configured to determine the first confidence score 522 in a similar fashion to determining the base confidence score 521 for the respective training target language phrase 511.

The method 700 hence advances to step 706.

Step 706: Feeding the Given Source Language Phrase to the Second Translation Ml Model to Generate: A Second Variant of Translation of the Given Source Language Phrase into the Target Language; and a Second Confidence Score Indicative of the Translation Accuracy of the Second Variant of Translation At step 706, according to certain non-limiting embodiments of the present technology, the server 202 can be configured to feed the given training source language phrase 501 to the second translation ML model 504 to generate the second target language translation variant 514 of the given training source language phrase 501. As mentioned above, the second translation ML model 504 has been pre-trained for translation of texts from the source to the target language 302, 304 through an intermediate language, different from the source and target language 302, 304. In some non-limiting embodiments of the present technology, akin to the first translation ML 502 model, the second translation ML model 504 can be implemented based on the ML model architecture 400.

In some non-limiting embodiments of the present technology, the second translation ML model 504 can comprise two sequentially connected translation ML models, the first one of which is configured to translate texts from the source language 302 to the intermediate language, and the second one of which is configured to translate texts from the intermediate language to the target language 304.

Further, the server 202 can be configured to determine, for the second target language translation variant 514, the second confidence score 524 indicative of the translation accuracy of the second target language translation variant 514. According to certain non-limiting embodiments of the present technology, the server 202 can be configured to determine the second confidence score 524 in a similar fashion to determining the base confidence score 521.

The method 700 hence advances to step 708.

Step 708: In Response to One of the First and Second Confidence Scores being Greater than the Base Confidence Score Associated with the Respective Target Language Phrase, Replacing, in the Target Language Corpus, the Respective Target Language Phrase with a Respective One of the First and Second Variants of Translation of the Given Source Language Phrase At step 708, according to certain non-limiting embodiments of the present technology, the server 202 can be configured to determine whether one of the first and second target language translation variants 512, 514 comprises a more accurate translation of the given training source language phrase 501 than the respective training target language phrase 511 initially corresponding thereto in the second corpus of texts.

To that end, as described in detail above with reference to FIG. 5, the server 202 can be configured to compare each one of the first and second confidence scores 522, 524 to the base confidence score 521. In response to determining that, for example, the second confidence score 524 is greater than the base confidence score 521, the server 202 can be configured to replace, in the second corpus of texts, the respective training target language phrase 511 with the second target language translation variant 514 of the given training source language phrase 501, generated by the second translation ML model 504. Else, in some non-limiting embodiments of the present technology, the server 202 can be configured to keep the respective training target language phrase 511 in the second corpus of texts.

In some non-limiting embodiments of the present technology, the server 202 can be configured to replace, in the second corpus of texts, the respective training target language phrase 511 with one of the first and second target language translation variants 512, 514 of the given training source language phrase 501 if a respective one of the first and second confidence scores 522, 524 is greater than the base confidence score 521 by a predetermined threshold difference value, such as 3, 5, or 10, as an example.

By executing steps 704 to 708, the server 202 can be configured to modify the second corpus of texts by (i) identifying therein training target language phrases that are non-parallel with the respective training source language phrases of the first corpus of texts; and (ii) replacing these non-parallel training target language phrases with more accurate target language translation variants of the respective training source language phrase.

The method 700 hence advances to step 710.

Step 710: Generating the Training Set of Data Including a Plurality of Training Digital Objects, a Given One of which Includes: (I) the Given Source Language Phrase; and (II) the Respective One of the First and Second Variants of Translation of the Given Source Language Phrase At step 710, after refining the second corpus of texts as described above, the server 202 can be configured to generate the training set of data for training the translation ML model of the translation engine 210 to generate translations of the user-input texts from the source language 302 into the target language 304—such as the respective target language phrase 214 for the given source language phrase 212 submitted to the translation engine 210 by the user 206.

The training set of data can include the plurality of training digital objects, the given one which can include: (i) the given training source language phrase 501; and (ii) the respective one of the first and second target translation variants 512, 514 thereof, associated with that one of the first and second confidence scores 522, 524 which was greater than the base confidence score 521 associated with the respective training target language phrase 511—such as the second target translation variant 514, as illustrated by the examples above. The method 700 hence advances to step 712.

Step 712: Training, Based on the Training Set of Data, the Translation Ml Model to Translate the Text from the Source Language into the Target Language At step 712, as described in detail above, in some non-limiting embodiments of the present technology, the server 202 can be configured to feed the so generated plurality of training digital objects to the translation ML model of the translation engine 210 for training thereof to generate translations of the user-input texts from the source to the target language 302, 304.

The method 700 thus terminates.

Certain non-limiting embodiments of the method 700 may allow generating target language translations of the user-input texts in the source language 302 into the target language 304 with higher accuracy, which may help improve the user experience of the users from interacting with the translation engine 210.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implementable method of generating a training set of data for training a translation machine-learning (ML) model, the generating including using: (i) a first translation ML model having been pre-trained to translate text from a source language to a target language; and (ii) a second translation ML model having been pre-trained to translate the text from the source language to an intermediate language and from the intermediate language to the target language, the method comprising:

receiving: (i) a source language corpus of texts including a first plurality of phrases in the source language; and (ii) a target language corpus of texts including a second plurality of phrases in the target language, a respective target language phrase from the second plurality of phrases being a translation of a given source language phrase from the first plurality of phrases from the source language into the target language;

the respective target language phrase being associated with a base confidence score indicative of a translation accuracy of the respective target language phrase;

feeding the given source language phrase to the first translation ML model to generate:

a first variant of translation of the given source language phrase into the target language; and a first confidence score indicative of a translation accuracy of the first variant of translation;

feeding the given source language phrase to the second translation ML model to generate:

a second variant of translation of the given source language phrase into the target language; and a second confidence score indicative of the translation accuracy of the second variant of translation;

in response to one of the first and second confidence scores being greater than the base confidence score associated with the respective target language phrase, replacing, in the target language corpus, the respective target language phrase with a respective one of the first and second variants of translation of the given source language phrase;

generating the training set of data including a plurality of training digital objects, a given one of which includes: (i) the given source language phrase; and (ii) the respective one of the first and second variants of translation of the given source language phrase; and training, based on the training set of data, the translation ML model to translate the text from the source language into the target language.

2. The method of claim 1, further comprising:

in response to each one of the first and second confidence scores being lower than or equal to the base confidence score associated with the respective target language phrase, keeping the respective target language phrase in the target language corpus.

3. The method of claim 1, further comprising determining the base confidence score associated with the respective target language phrase.

4. The method of claim 3, wherein the determining the base confidence score comprises applying the first translation ML model.

5. The method of claim 1, wherein:

the method further comprises using a third translation ML model having been pre-trained to translate text from the target language to the source language; and wherein generating a given confidence score of the base, first, and second confidence scores comprises:

generating a respective direct confidence score of a respective one of the respective target language phrase and the first and second variants of translation of the given source language phrase into the target language;

feeding each one of the respective target language phrase and the first and second variants of translation of the given source language phrase to the third translation ML model to generate:

respective inverse variants of translation of the respective target language phrase associated with the given source language phrase into the source language; and a respective inverse confidence score of each one of the respective inverse variants of translation of the respective target language phrase into the source language; and combining the respective direct and the respective inverse confidence scores.

6. The method of claim 5, wherein the combining comprises determining a sum of the respective direct and the respective inverse confidence scores.

7. The method of claim 1, wherein the translation ML model is different from any one of the first and second translation ML models.

8. The method of claim 1, wherein:

the translation ML model is one of the first and second translation ML models; and the training the translation ML model comprises fine-tuning the one of the first and the second translation ML models to translate the text from the source language into the target language.

9. The method of claim 1, wherein the second translation ML model comprises two translation ML models: (i) a first intermediate translation ML model having been pre-trained to translate the text from the source language to the intermediate language; and (ii) a second intermediate translation ML model having been pre-trained to translate the text from the intermediate language to the target language.

10. The method of claim 1, wherein a given one of the first and second translation ML models is a neural network-based ML model.

11. The method of claim 10, wherein the neural network-based ML model is a Transformer ML model.

12. A server for generating a training set of data for training a translation machine-learning (ML) model, the generating including using: (i) a first translation ML model having been pre-trained to translate text from a source language to a target language; and (ii) a second translation ML model having been pre-trained to translate the text from the source language to an intermediate language and from the intermediate language to the target language, the server comprising at least one processor and at least one non-transitory computer-readable memory comprising executable instructions, which, when executed by the at least one processor, cause the server to:

receive: (i) a source language corpus of texts including a first plurality of phrases in the source language; and (ii) a target language corpus of texts including a second plurality of phrases in the target language, a respective target language phrase from the second plurality of phrases being a translation of a given source language phrase from the first plurality of phrases from the source language into the target language;

the respective target language phrase being associated with a base confidence score indicative of a translation accuracy of the respective target language phrase;

feed the given source language phrase to the first translation ML model to generate:

a first variant of translation of the given source language phrase into the target language; and a first confidence score indicative of a translation accuracy of the first variant of translation;

feed the given source language phrase to the second translation ML model to generate:

a second variant of translation of the given source language phrase into the target language; and a second confidence score indicative of the translation accuracy of the second variant of translation;

in response to one of the first and second confidence scores being greater than the base confidence score associated with the respective target language phrase, replace, in the target language corpus, the respective target language phrase with a respective one of the first and second variants of translation of the given source language phrase;

generate the training set of data including a plurality of training digital objects, a given one of which includes: (i) the given source language phrase; and (ii) the respective one of the first and second variants of translation of the given source language phrase; and train, based on the training set of data, the translation ML model to translate the text from the source language into the target language.

13. The server of claim 12, wherein the at least one processor further causes the server to: in response to each one of the first and second confidence scores being lower than or equal to the base confidence score associated with the respective target language phrase, keep the respective target language phrase in the target language corpus.

14. The server of claim 12, wherein the at least one processor further causes the server to determine the base confidence score associated with the respective target language phrase.

15. The server of claim 14, wherein to determine the base confidence score, the at least one processor causes the server to apply the first translation ML model.

16. The server of claim 12, wherein the at least one processor further causes the server to gain access to a third translation ML model having been pre-trained to translate text from the target language to the source language; and wherein:

to generate a given confidence score of the base, first, and second confidence scores, the at least one processor causes the server to:

generate a respective direct confidence score of a respective one of the respective target language phrase and the first and second variants of translation of the given source language phrase into the target language;

feed each one of the respective target language phrase and the first and second variants of translation of the given source language phrase to the third translation ML model to generate:

respective inverse variants of translation of the respective target language phrase associated with the given source language phrase into the source language; and a respective inverse confidence score of each one of the respective inverse variants of translation of the respective target language phrase into the source language; and combine the respective direct and the respective inverse confidence scores.

17. The server of claim 16, wherein to combine the respective direct and inverse confidence scores, the at least one processor causes the server to determine a sum of the respective direct and the respective inverse confidence scores.

18. The server of claim 12, wherein the translation ML model is different from any one of the first and second translation ML models.

19. The server of claim 12, wherein:

the translation ML model is one of the first and second translation ML models; and the training the translation ML model comprises fine-tuning the one of the first and the second translation ML models to translate the text from the source language into the target language.

20. The server of claim 12, wherein the second translation ML model comprises two translation ML models: (i) a first intermediate translation ML model having been pre-trained to translate the text from the source language to the intermediate language; and (ii) a second intermediate translation ML model having been pre-trained to translate the text from the intermediate language to the target language.

* * * * *